Figure 1:
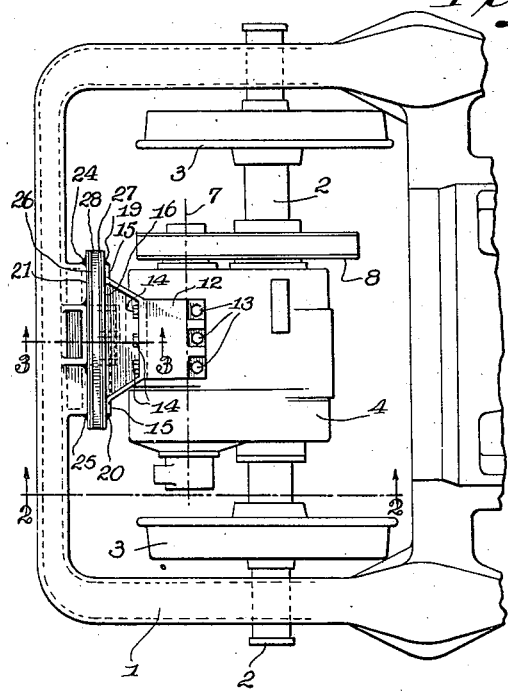

July 8, 1941.  H. K. HARWICK  2,248,869

RESILIENT MOUNTING DEVICE

Filed Feb. 27, 1939

INVENTOR.

Henry K. Harwick

BY John R. Faiborp
ATTORNEY.

Patented July 8, 1941

2,248,869

UNITED STATES PATENT OFFICE 2,248,869

RESILIENT MOUNTING DEVICE

Henry K. Harwick, Darby, Pa., assignor to Edward G. Budd Manufacturing Co., Philadelphia, Pa., a corporation of Pennsylvania Application February 27, 1939, Serial No. 258,671

4 Claims. (Cl. 105—139)

The present invention relates to means for mounting mechanically driven apparatus on the axle of a vehicle whereby a slight degree of yieldability is imparted to the said apparatus so that vibration and other relative movements of the axle with respect to the frame in which it is mounted will not have any injurious effects upon the apparatus.

Heretofore it has been common to mount air or refrigerant compressors, electrical generators, and the like upon car axles by bolting the support to the end transom of the wheel truck, with springs and the like sometimes interposed, whereby the freedom of motion was limited to one or two planes. Lack of universal freedom of movement often caused the bolts to fail by shearing off, thus causing the support to fail and often resulting in serious troubles.

The present invention contemplates interposing in the support a yieldable sandwich consisting of a mass of rubber vulcanized between metal plates, these plates being secured to the electrical or other driven apparatus on the one hand and to the truck on the other hand, in any suitable way as by rivets, bolts, welding, etc.

Figure 3:
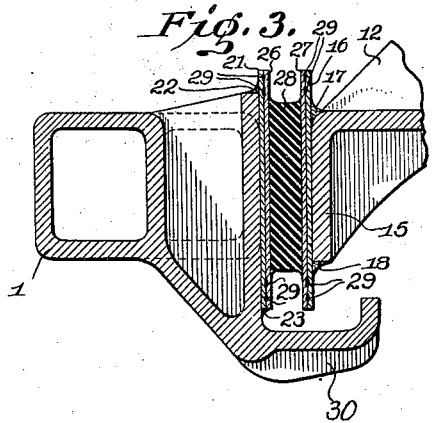
Figure 2:
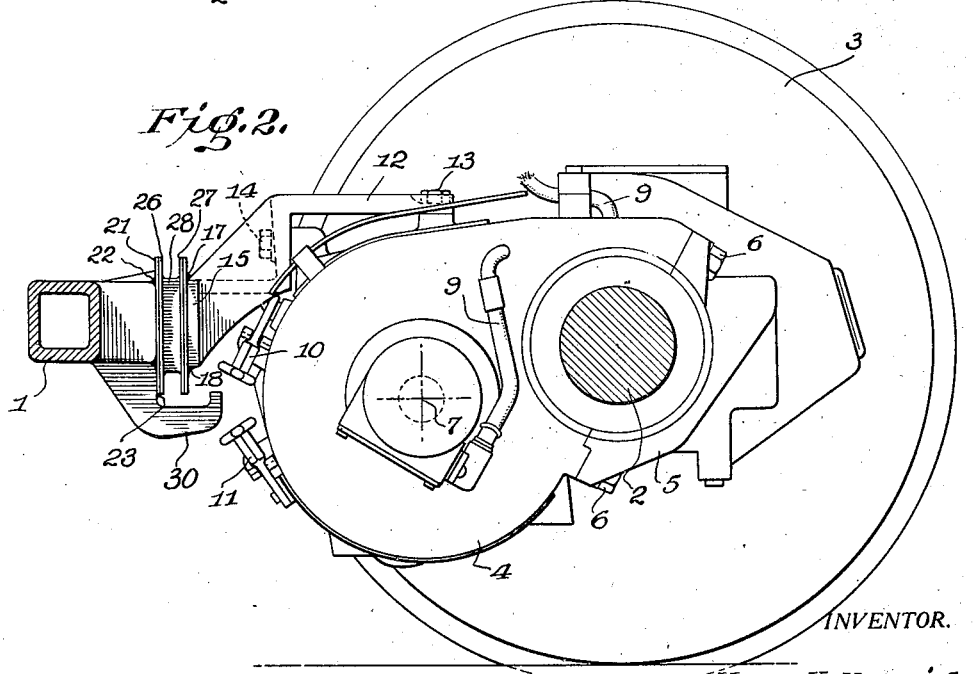

A specific embodiment of the invention is described in the present specification in connection with the drawing belonging thereto. In the said drawing:

Fig. 1 is a plan view showing a fragment of a truck comprising an axle with its customary wheels and with a generator mounted on the axle and secured to the truck by a yieldable means, Fig. 2 is an enlarged sectional elevation of a portion of the structure illustrated in Fig. 1, the section being made in the plane indicated by the line 2—2, looking in the direction of the arrows, and Fig. 3 is a fragmentary section on a still larger scale, the section being made in the vertical plane indicated by the line 3—3 of Fig. 1, looking in the direction of the arrows, and illustrating the construction of the yieldable joint in greater detail.

In all the figures corresponding parts are designated by the same reference character.

In Fig. 1, I indicates a portion of the end of a wheel truck carrying the axle 2 upon which are mounted the wheels 3, 3. A generator enclosed in the casing 4 is mounted upon the axle 2, the said casing having a removable portion 5 secured to the remainder thereof by bolts or cap screws 6 so as to permit mounting the said casing upon the axle 2. It will be understood that the armature shaft (not shown) of the generator will be located about the center line 7. In order to rotate the armature, gears or other drive means are preferably provided and these are suitably accommodated and protected in the housing 8. The electrical cable leading from the generator is indicated at 9 and is here shown conventionally. At 10 and 11 are shown clamping devices for the casing 4, such devices permitting access to the generator for inspection or repair.

It will be clear that any conventional generator, or other driven device, and casing as well as any desired drive means may be provided within the spirit of the present invention.

Heretofore it has been customary to secure the generator casing such as 4 against rotation as a whole about the axle 2 by providing either a rigid metallic connection between some part of the casing and a stationary part of the wheel truck or by interposing springs or the like, in cooperation with bolts or other fastening means. This prior construction, however, was unsatisfactory in that it did not give sufficient freedom of movement in all directions, with the consequence that binding and breakage often occurred. It will be realized that the conditions of operation of such generators are extremely severe because of the jolting, vibration, twisting, warping, and other strains which occur in the normal operation of railway vehicles.

These disadvantages have been obviated by the present securing means which comprise a support 12 which is removably secured to the generator mounting by the cap screws 13 or the like, on the one hand, and by the bolts or cap screws 14, on the other hand, thus providing a very rigid connection between the member 12 and the casing 4 of the generator.

The member 12 may be widened at its outer end and provided with flanges 15, for securing it to the frame 1. Preferably a metal plate 16 is secured to the member 12 by arc welding or acetylene welding, in either case thus providing fillets of metal as shown at 17 and 18 in Figs. 2 and 3, and additionally by fillets shown at 19 and 20 in Fig. 1, whereby the plate 16 is firmly secured to the support 12.

A similar plate 21 is secured in a like manner to the framework 1, as by the fillets 22, 23, 24, and 25 respectively. These two plates 16 and 21 will thus stand practically opposite one another and parallel to one another, one of them being substantially an integral part of the frame 1 and the other being substantially integral with the member 12.

The connection between the plates 16 and 21 is provided by means of the sandwich consisting of the plates 26 and 27, to which the opposite faces of a rubber block 28 have been secured firmly, preferably by vulcanizing. The said sandwich is slipped between the plates 16 and 21 and the plates 26 and 27 are then welded by spot welding to the adjacent respective plates 21 and 16. These spot welds are indicated at 29 and preferably they are located along the upper and lower edges of the respective plates, which are readily accessible for spot welding, this construction also permitting the rubber to extend throughout the entire horizontal length of the plates to which it is vulcanized, so that the rubber sandwich may be made by vulcanizing a continuous length of rubber between two metal strips and then cutting off the necessary length from such continuous strip, thus facilitating the manufacture thereof.

As a safety precaution, a hook 30 may be formed on the frame 1 and located below the outer end of the member 12 so that in case of failure of the joint between the member 12 and the frame 1 for any reason, the hook 30 will catch the end of the member 12 and support it by reason of the weight of the generator and its associated parts, while allowing sufficient freedom of relative motion between the casing 4 and the frame 1 so that the generator will continue to operate until the breakage can be repaired.

It will be understood that while freedom of motion in practically all directions is necessary in the normal operation of the generator, to avoid damage from shocks and jolts, yet the extent of such motion is normally extremely slight and well within the power of the rubber to absorb. The rubber at the same time acts as a vibration damper and prevents the setting up of resonant vibrations of sufficient extent to injure the apparatus.

The operation of the device is of course obvious from the structure already described. Briefly stated, the generator is driven from the axle by suitable gearing or the like, both the generator and the gear drive being encased in enclosures to prevent the access of dirt and water. The rubber member 28 assumes the shearing force produced by the generator during its operation, including both the normal force produced by the magnetic pull of the armature as well as that due to the weight of the generator, part of which is supported by the axle 2 and the rest by the rubber member 28, and also the varying dynamic forces due to irregularities in the driving of the car or other vehicle due, for example, to imperfect road beds or various other common causes.

Because the area of rubber which resists these forces is relatively great, it will be understood that the unit shearing stress in the rubber is very low so that there is a large factor of safety in operation. The rubber also assumes such tensile and compressive stresses as may occur from vibration of the axle 2 with respect to the frame 1, and here again the stress is spread over a large area so that there is likewise an ample factor of safety. However, if in spite of all this the rubber sandwich should fail for any reason, it is necessary merely to remove the rubber member 28 together with the adhering plates 26 and 27, by cutting the spot welds, and to replace it with a new sandwich in exactly the same way.

The rubber permits a slight degree of motion in any necessary direction and thus prevents the production of any undue stresses in the unyielding metal parts and thereby saves the bolts or other fasteners from shearing or failing by reason of long continued vibratory stresses, or by sudden large shearing or tensile stresses, which failure otherwise might occur if there were a rigid metallic connection, or even a metallic-spring connection, instead of the rubber.

It will be noted that the present mounting constitutes practically a three-point suspension, since the generator 4 is supported by the two ends of the axle 2 on the one hand, and by the rubber sandwich 28 on the other hand, thus providing an additional safeguard against binding or lack of alinement.

Obviously it is possible to modify the structure in many ways without departing from the spirit of the invention, which is defined solely by the following.

What I claim is:

1. A mounting means for yieldably securing an axle-mounted driven mechanism with respect to the axle and frame of a vehicle, the said mounting means including a rigid bracket, secured to the driven mechanism, said bracket extending away from the said axle, and having a substantially flat end surface substantially at right angles to the horizontal plane through the axle, a cooperating portion having an opposed similar surface spaced from the said end surface and substantially parallel thereto, formed on the frame of the vehicle, and an interposed sandwich, consisting of a rubber element secured to two plates of metal, the said plates of metal fitting between, and being rigidly secured to, the said opposite and parallel faces on the bracket and on the frame of the vehicle respectively.

2. A mounting means for yieldably securing an axle-driven mechanism with respect to the axle and frame of a vehicle, the said mounting means including a rigid bracket secured to the driven mechanism, and extending away from the said axle, and a sandwich, consisting of a rubber plate secured to two plates of metal, interposed between, and secured to, flat face portions of the bracket and the frame of the vehicle respectively, said face portions and sandwich being arranged substantially at right angles to the horizontal plane through the axle.

3. A mounting means for yieldably securing an axle-driven mechanism with respect to the axle and frame of a vehicle, the said mounting means including a rigid bracket secured to the driven mechanism, and extending away from the said axle, and a sandwich, consisting of a rubber plate secured to two plates of metal, interposed between, and secured to, the bracket and the frame of the vehicle respectively, the planes of the said plates being substantially parallel to the axis of the axle and substantially at right angles to the horizontal plane through said axle.

4. A mounting means for yieldably securing an axle-driven mechanism with respect to the axle and frame of a vehicle, the said mounting means including a rigid bracket secured to the driven mechanism and extending away from said axle, a rubber plate interposed between, and secured through its opposite faces to, the bracket and the frame of the vehicle, respectively, the plane of said plate being substantially parallel to the axis of the axle and substantially at right angles to the horizontal plane through said axle.

HENRY K. HARWICK.